(12) United States Patent
Pearson

(10) Patent No.: US 8,194,834 B2
(45) Date of Patent: Jun. 5, 2012

(54) METHOD FOR SELECTIVE CALL-WAITING IN A COMMUNICATION SYSTEM

(75) Inventor: Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1470 days.

(21) Appl. No.: 11/343,074

(22) Filed: Jan. 30, 2006

(65) Prior Publication Data

US 2007/0189475 A1 Aug. 16, 2007

(51) Int. Cl.
*H04M 1/56* (2006.01)
*H04M 15/06* (2006.01)
*H04M 3/42* (2006.01)

(52) U.S. Cl. .............................. 379/142.08; 379/215.01

(58) Field of Classification Search ............. 379/142.06, 379/142.07, 142.08, 207.02, 207.15, 207.16, 379/211.01, 215.01
See application file for complete search history.

(56) References Cited

U.S. PATENT DOCUMENTS

| | | | | |
|---|---|---|---|---|
| 6,026,156 A * | 2/2000 | Epler et al. | ............... | 379/215.01 |
| 6,160,877 A * | 12/2000 | Tatchell et al. | ............... | 379/197 |
| 2003/0108172 A1 | 6/2003 | Petty et al. | | |
| 2004/0234061 A1 * | 11/2004 | Koch et al. | ............... | 379/207.02 |
| 2005/0135342 A1 | 6/2005 | Kim | | |
| 2005/0245236 A1 * | 11/2005 | Servi et al. | ................... | 455/411 |
| 2007/0072593 A1 * | 3/2007 | Huliyapur Math | ........... | 455/415 |

* cited by examiner

*Primary Examiner* — Quoc D Tran
(74) *Attorney, Agent, or Firm* — Guntin Meles & Gust, PLC; Andrew Gust

(57) ABSTRACT

A system and method (300) are disclosed for selective call-waiting in a communication system. A system that incorporates teachings of the present disclosure may include, for example, a communication device (102) having a controller (206) that manages operations of a transceiver (202) for exchanging messages in a communication system, and a user interface (UI) (204) for exchanging messages with an end user of the communication device. The controller can be programmed to establish (302) voice communications with a first party, receive (308) a caller ID associated with a call from a second party while voice communications are taking place with the first party, compare (314) the caller ID with a phonebook, and if an entry in the phonebook matches the caller ID, submit (316, 320) a notification to the end user of the communication device that identifies the call from the second party. Additional embodiments are disclosed.

16 Claims, 4 Drawing Sheets

METHOD FOR SELECTIVE CALL-WAITING IN A COMMUNICATION SYSTEM

FIELD OF THE DISCLOSURE

The present disclosure relates generally to call-waiting techniques, and more specifically to a method for selective call-waiting in a communication system.

BACKGROUND

Call-waiting services in a public switched telephone network (PSTN) or an IP network offering Voice over IP (VoIP) services can be a useful means for detecting calls from second parties during an established voice session. Presently, operators offer a call-waiting service in which said service is applied to all calling parties or none at all.

A need therefore arises for a method for selective call-waiting in a communication system.

DETAILED DESCRIPTION

Embodiments in accordance with the present disclosure provide a method for call-waiting in a communication system.

In a first embodiment of the present disclosure, a communication device has a controller that manages operations of a transceiver for exchanging messages in a communication system, and a user interface (UI) for exchanging messages with an end user of the communication device. The controller can be programmed to establish voice communications with a first party, receive a caller ID associated with a call from a second party while voice communications are taking place with the first party, compare the caller ID with a phonebook, and if an entry in the phonebook matches the caller ID, submit a notification to the end user of the communication device that identifies the call from the second party.

In a second embodiment of the present disclosure, a computer-readable storage medium operates in a communication device. The storage medium can have computer instructions for selectively enabling a call-waiting function according to entries in a phonebook.

In a third embodiment of the present disclosure, a computer-readable storage medium operates in a remote device. The storage medium can have computer instructions for managing a phonebook retrievable by a communication device for selectively enabling a call-waiting function according to entries in the phonebook, wherein the remote device comprises one among a server hosting a website application, an interactive voice response system (IVR), a storage device, and a computing device.

In a fourth embodiment of the present disclosure, a computer-readable storage medium operates in a network management system (NMS). The storage medium can have computer instructions for selectively enabling a call-waiting function associated with a communication device according to entries in a phonebook.

In a fifth embodiment of the present disclosure, a communication device operates in a communication system according to an exemplary method. The method can have the steps of receiving a second voice call from a second party during a first voice call established with a first party, and enabling a call-waiting function upon detecting a match between a caller ID of the second voice call and an entry in a phonebook.

Figure 1:
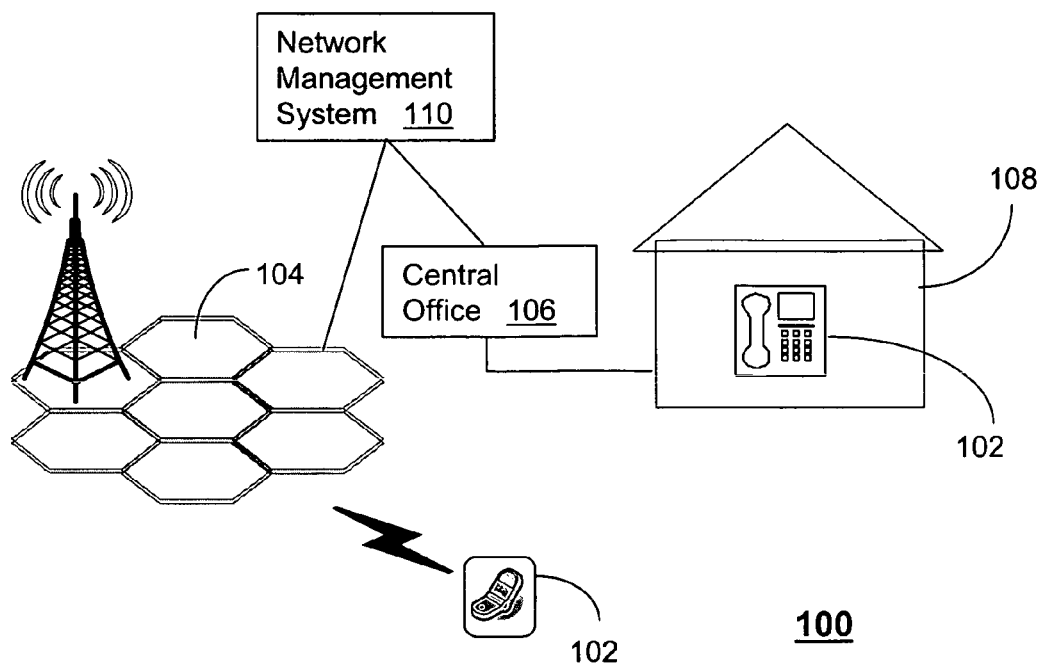
FIG. 1 depicts alternate embodiments of a communication device operating in a communication system.

FIG. 1 depicts an exemplary embodiment of a communication device 102 operating in a communication system 100. The communication device 102 can be capable of communicating with any number of access technologies operating in a base station 104 such as, for example, cellular, software defined radio (SDR) and/or WiMAX technologies, just to mention a few. Cellular technologies can include, for example, CDMA-1X, UMTS/HSDPA, GSM/GPRS, TDMA/EDGE, CDMA EV/DO, and next generation technologies as they arise. The communication device 102 can be programmed to perform spectrum analysis utilizing SDR techniques to identify available portions of spectrum in a local area.

In yet another embodiment, the communication device 102 can represent a wireline or cordless communication device located in a residence or commercial building 108 coupled to a central office 106 that provides local, long-distance, and Internet services by way a plain old telephone service (POTS) interface, DSL, WiFi access point, and/or cable connection. Any of the foregoing wireline, wireless, or cordless access technologies can support circuit-switched applications over a public switched telephone network (PSTN) or packet-switched Internet Protocol (IP) services such as Voice over IP (VoIP) and/or IPTV services.

Figure 2:
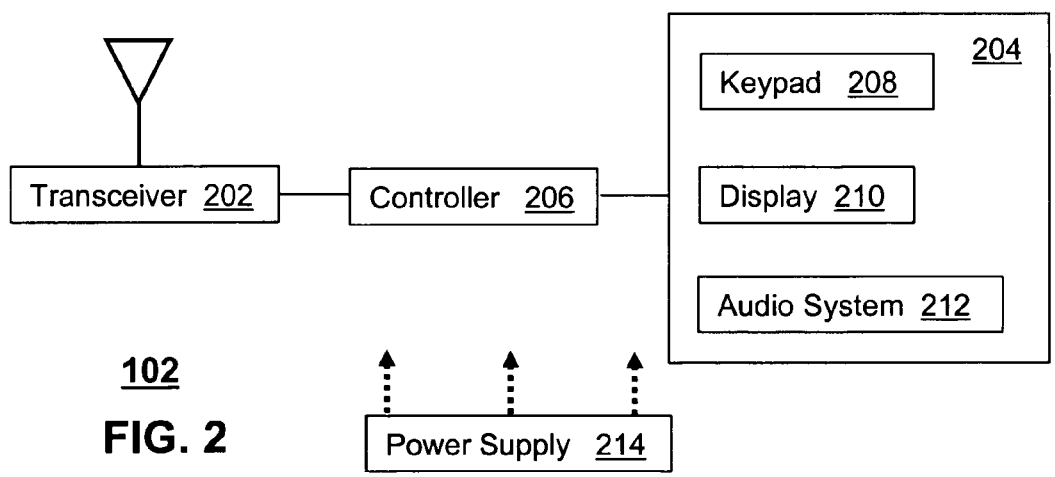
FIG. 2 depicts an exemplary block diagram of the communication device.

FIG. 2 depicts an exemplary embodiment of the communication device 102 of the communication system 100. The communication device 102 can comprise a wireline and/or wireless transceiver 202, a user interface (UI) 204, a power supply 214, and a controller 206 for managing operations thereof. The wireless transceiver 202 utilizes common communication technology for supporting the aforementioned wireless access technologies (i.e., cellular, SDR, WiMAX, WiFi, and cordless). Alternatively, or in combination, the communication device 102 can support wireline communication services over a POTS, DSL, or cable interface. The UI 204 can include a depressible keypad 208 for manipulating operations of the communication device 102. The UI 204 can further include a display 210 such as monochrome or color LCD (Liquid Crystal Display) for conveying images to the end user of the communication device 102. The audio system 212 of the UI 204 utilizes common audio technology for exchanging audible signals with an end user of the communication device 102.

The power supply 214 can utilize common power management technologies (such as replaceable batteries, supply regulation technologies, and charging system technologies) for supplying energy to the components of the communication device 102 to facilitate portable or immobile applications. The controller 206 can utilize computing technologies such as a microprocessor and/or digital signal processor (DSP) with associated storage memory such a Flash, ROM, RAM, SRAM, DRAM or other like technologies.

The base station 104 can comprise a wireless transceiver, a power supply, and a controller for managing operations thereof. The wireless transceiver in this embodiment is generally much larger and more costly than the wireless transceiver of the communication device 102. Generally, speaking base stations can utilize large towers (as shown in FIG. 1) for emanating and receiving RF signals from the communication devices 102 according to any one of the aforementioned access technologies. The wireless transceiver further includes a number of computing devices and power amplifiers to support these access technologies across a wide geographic region. The power supply can be a combination of a conventional uninterrupted power supply (UPS) system supported with power from a utility company. The controller can comprise a number of computing devices such as scalable servers with associated nonvolatile (e.g., mass storage media) and volatile memories (e.g., RAM, SRAM, DRAM, etc.). Alternatively, the base station 104 can be represented by a WiFi access point in a residence or commercial building 108 with a short wireless reach.

A network management system (NMS) 110 of the communication system 100 can be coupled by common wireless or wireline communication means to either of the base station 104 and the central office 106. The NMS 110 can utilize common communications and computing technology for managing operations of the base station 104 and the central office 106 according to the teachings of the present disclosure.

Figure 3:
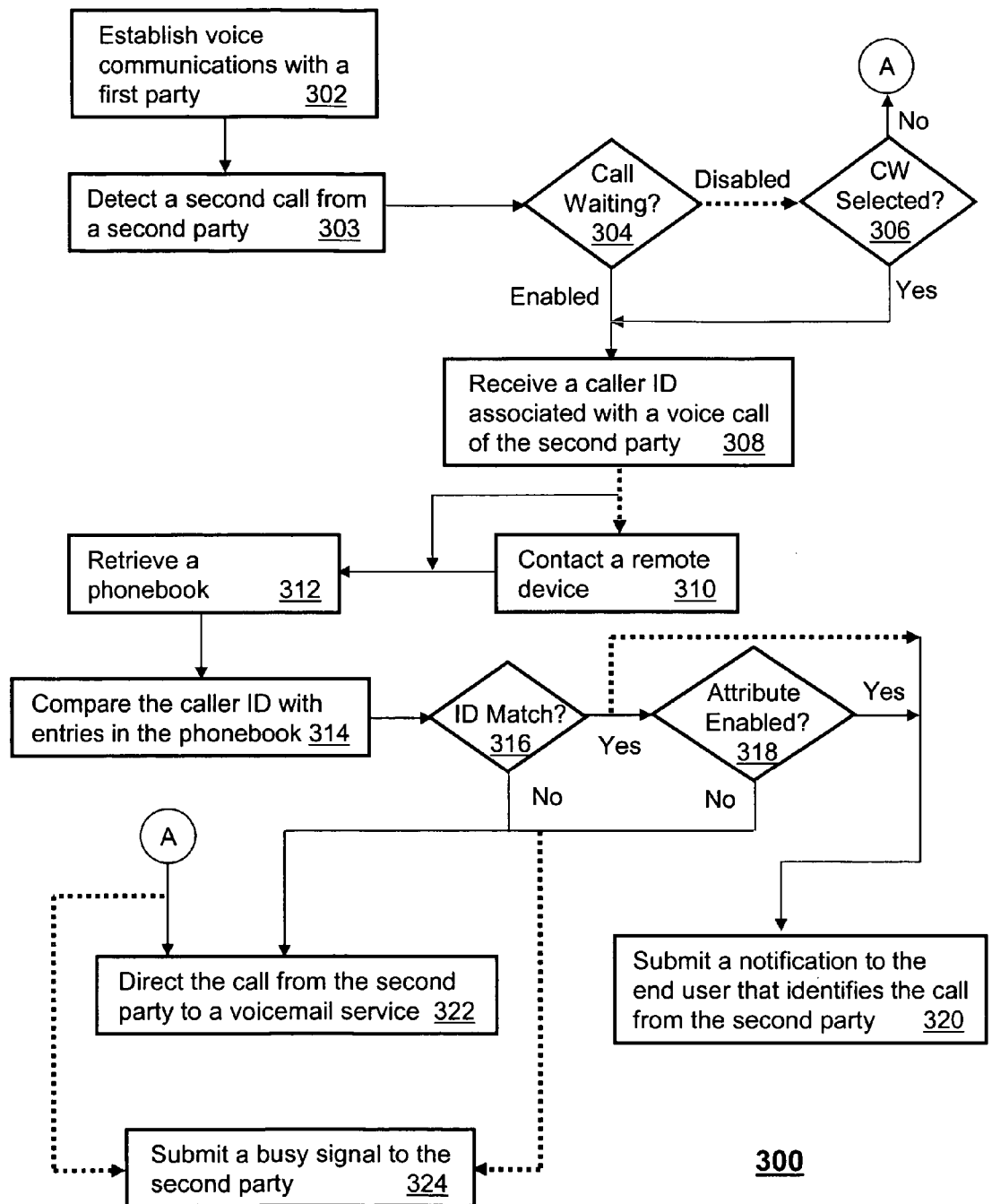
FIG. 3 depicts an exemplary method operating in the communication device or a network management system of the communication system.

FIG. 3 depicts an exemplary method 300 operating in the communication device 102 or the NMS 110. For illustration purposes only, method 300 will be discussed in relation to the communication device 102. The descriptions that follow can be applied also to the NMS 10. Accordingly, method 300 begins with step 302 where the controller 206 establishes communications with a first party. This step can represent a common voice call initiated and accepted by either of the first party or the end user of the communication device 102 over the communication system 100. Voice communications between the first party and the end user can take place using PSTN/POTS services operating with a signaling system 7 (SS7) flow control protocol, or IP services operating according to a session initiation protocol (SIP) flow control protocol. During the voice communications of step 302, the controller 206 can be programmed to detect in step 303 a second call from a second party over POTS or IP services.

Upon detecting the second call, the controller 206 proceeds to step 304 where it checks whether the call-waiting function has been enabled. If it is disabled, the controller 206 can be programmed to proceed to step 306 (which can operate as a background process) where it checks for the end user to enable the call-waiting function during the second call or at any other time by way of the UI 204 (e.g., a soft or hard button of the keypad 208). If the end user enables the call-waiting function, the controller 206 proceeds to step 308. Otherwise, the controller 206 continues to check the status of the call-waiting function in steps 304-306 during which the second party can also be directed to a voicemail service in step 322, or an SS7 or SIP busy signal is transmitted to the second party in step 324 depending on whether POTS or IP services are being used.

If the call-waiting function is enabled prior or during the second call, the controller 206 proceeds to step 308. In this step the controller 206 can be programmed to receive a caller ID associated with a voice call of the second party from the SS7 or SIP protocols. If a phonebook associated with the communication device 102 is stored and managed at a remote device, the controller 206 proceeds to step 310 where it contacts the remote device. Once the remote device is located, the controller 206 proceeds to step 312 where it retrieves the phonebook.

Figure 4:
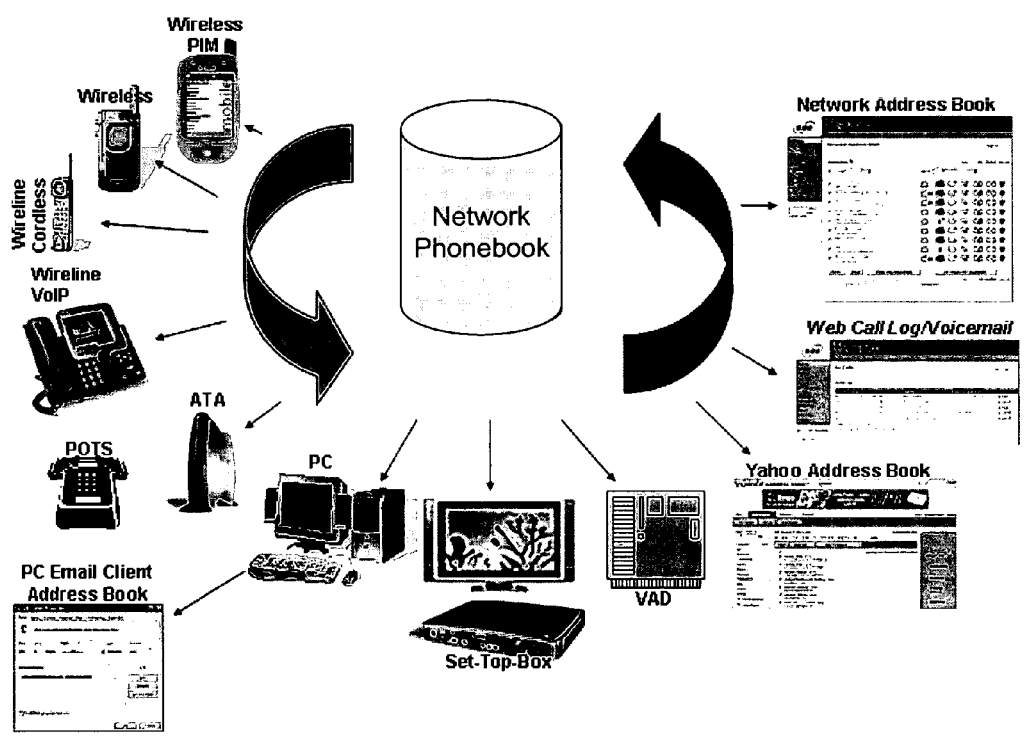
FIG. 4 depicts alternate embodiments of a remote device for managing the phonebook of the communication device.

FIG. 4 illustrates by way of example a number of embodiments of a remote device that can manage and store the phonebook of the communication device 102. Possible embodiments include a wireless PDA, a cellular phone, a cordless phone, a desktop computer, a set-top-box, an interactive voice response system (IVR) hosted by a computing device for managing the phonebook, and so on. As should be evident from this illustration, there can be innumerable devices that can be used for managing, storing, and synchronizing the communication device's 102 phonebook. In an alternative embodiment, the phonebook can be managed in the communication device 102 itself rather than a remote device as described above. In this instance, the controller 206 proceeds from step 308 to step 312.

Once the phonebook has been retrieved, the controller 206 proceeds to step 314 where it compares the caller ID with entries in the phonebook. If an entry is found, the controller 206 proceeds to step 316 where it checks for a match between the caller ID and an entry in the phonebook. If a match is found, the controller 206 proceeds to one of steps 318 and 320. In step 318, the controller 206 can be programmed to check an additional attribute included in each phonebook entry. This attribute can be used for selectively enabling or disabling the call-waiting function in each phonebook entry. This embodiment provides additional flexibility to distinguish who among the calling parties will be recognized with the call-waiting function.

Accordingly, if the attribute is enabled, the controller 206 proceeds to step 320 where it submits a notification to the end user that identifies the call from the second party. The notification can include the caller ID conveyed by the display 210, an audible signal carried by a (data or voice) channel of the communication system 100 carrying the conversation between the first party and the end user and conveyed to the end user by a low volume speaker of the audio system 212, and/or a distinctive ring or ring tone that can be heard by the end user by way of a load speaker of the audio system 212 during voice communications with the first party. Alternatively, the controller 206 can proceed directly from step 316 to step 320 if a match between the caller ID and a phonebook entry is found. In this embodiment, the call-waiting function is executed in accordance with step 320 simply if the caller ID matches an entry in the phonebook.

If, on the other hand, there is no match found between the caller ID and the phonebook entries in step 316, or in step 318 the call-waiting function is disabled by way of its corresponding attribute for a matched entry found in step 316, the controller 206 can be programmed to proceed to one among steps 322 or 324 where the second party is directed to a voicemail system, or a busy signal is transmitted to the second party according to any one of the SS7 and SIP protocols. The voicemail system can operate in the communication device 102 or in a remote voicemail server of the communication system 100.

Method 300 as described above can be in large part operated in the NMS 110. For instance, the NMS 110 can be programmed to detect the second call, check whether the call-waiting function has been enabled prior or during the call, retrieve the phonebook (locally or remotely) and compare the caller ID to the phonebook entries. Once a match is found, the NMS 110 can notify the end user of the second call as described above. Otherwise, the NMS 110 can direct the second caller to a voicemail system operating in the NMS 110 or a remote system, or submit a busy signal thereto. As described earlier, the foregoing operations can take place in a POTS or IP services environment.

Figure 5:
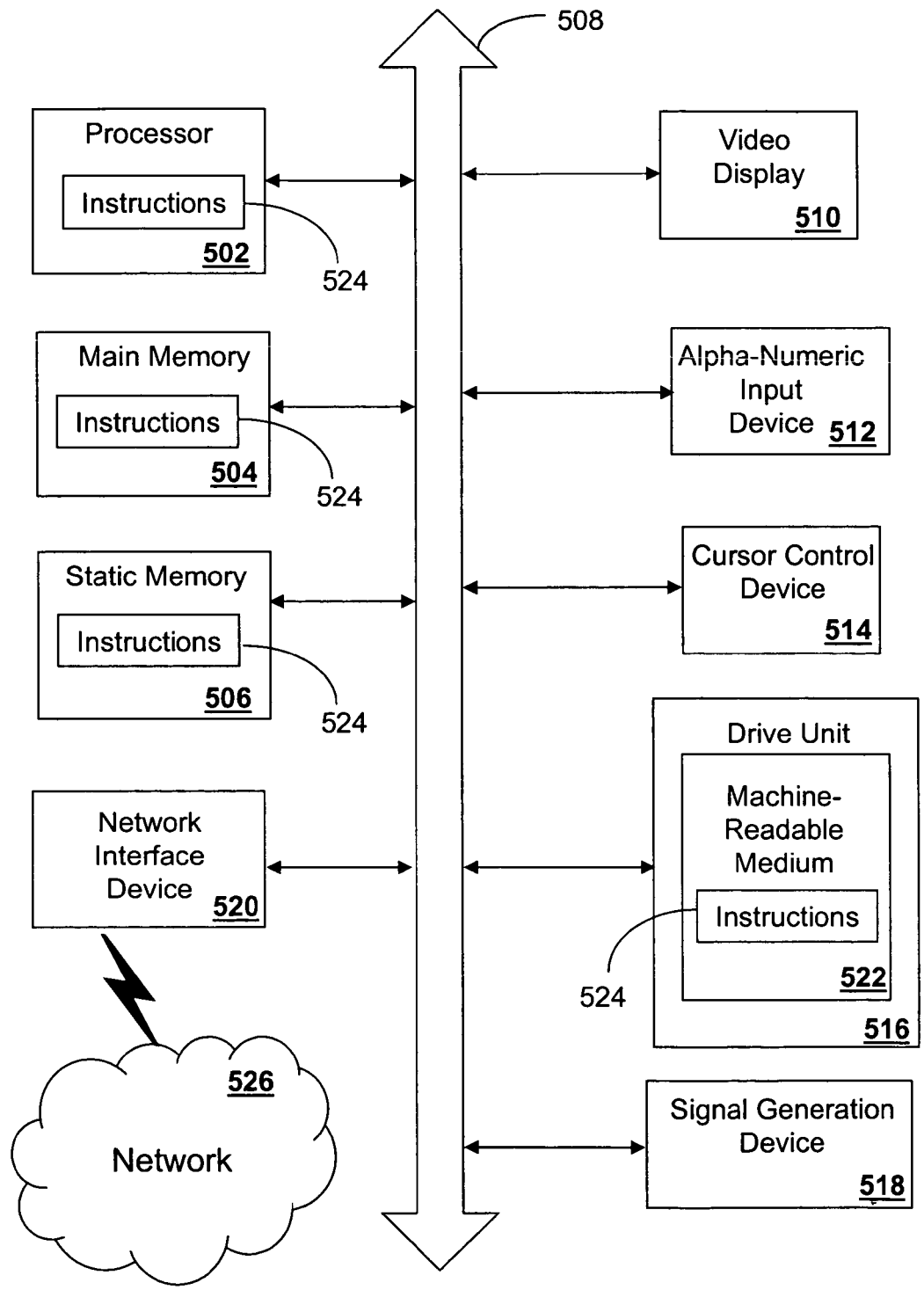
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
a transceiver for exchanging messages in a communication system;
a controller that manages operations of the transceiver; and
a user interface for exchanging the messages with an end user of the communication device,
wherein the controller is programmed to perform operations comprising:
facilitating establishing voice communications with a first party;
receiving a caller ID associated with a call from a second party while voice communications are taking place with the first party;
retrieving a phonebook from at least one other communication device associated with the end user, wherein the at least one other communication device is an end user device;
comparing the caller ID with the phonebook, wherein each entry in the phonebook includes an attribute for a status of a call-waiting function; and
if an entry in the phonebook matches the caller ID, and the attribute of the entry indicates that the call-waiting function is enabled, submitting a notification that identifies the call from the second party.

2. The communication device of claim 1, wherein the controller is programmed to direct the call from the second party to a voicemail service if no entry in the phonebook matches the caller ID.

3. The communication device of claim 1, wherein the controller is programmed to submit a busy signal to the second party if no entry in the phonebook matches the caller ID.

4. The communication device of claim 1, wherein the controller is programmed to process at least one among Voice over IP messages, voice messages associated with a public switched telephone networker or Internet Protocol Television services.

5. The communication device of claim 1, wherein the controller is programmed to retrieve the phonebook from a remote device.

6. The communication device of claim 5, wherein the remote device comprises a computing device, and wherein the controller is programmed to:
contact the computing device; and
retrieve the phonebook upon detecting the computing device.

7. The communication device of claim 1, wherein the controller is programmed to:
detect from the user interface a selection for enabling a call-waiting function; and
compare the caller ID with the phonebook when the call-waiting function is enabled.

8. A computer-readable storage medium operating in a communication device, comprising computer instructions which when executed by a processor cause the processor to perform operations comprising:
retrieving a phonebook from at least one other end user device;
selectively enabling a call-waiting function according to entries in the phonebook, wherein each entry in the phonebook includes an attribute for a status of a call-waiting function;
submitting a notification upon detecting a match between a caller ID associated with a second call and an entry in the phonebook during an established first call; and
detecting an indication in the entry in the phonebook that the call-waiting function has been enabled, wherein the communication device is an end user device.

9. The storage medium of claim 8, comprising computer instructions to direct a second call of a second party to a voicemail service during an established first call with a first party if a received caller ID associated with the second party does not match an entry in the phonebook.

10. The storage medium of claim 8, comprising computer instructions to submit a busy signal on a second call of a second party during an established first call with a first party if a received caller ID associated with the second party does not match an entry in the phonebook.

11. The storage medium of claim 8, comprising computer instructions to process at least one among Voice over IP messages, voice messages associated with a public switched telephone network, and Internet Protocol Television services.

12. A computer-readable storage medium operating in an end user device, comprising computer instructions which when executed by a processor cause the processor to perform operations comprising:
receiving a second voice call during a first voice call at the end user device, wherein the first and second calls are voice over IP calls;
retrieving a phonebook from at least one other end user device;
enabling a call-waiting function upon detecting a match between a caller ID of the second voice call and an entry in the phonebook, the match being detected by the end user device; and
presenting a notification at the end user device that identifies the second voice call, wherein each entry in the phonebook includes an attribute for a status of the call-waiting function.

13. A communication device, comprising:
a memory storing computer instructions;
a transceiver for exchanging messages in a communication system;
a controller that manages operations of the transceiver; and
a user interface for exchanging the messages with an end user of the communication device,
wherein the controller when executing the computer instructions performs a method, the method comprising:
receiving a second voice call during a first voice call at the communication device;

retrieving a phonebook from at least one other end user device;

enabling a call-waiting function upon detecting a match between a caller ID of the second voice call and an entry in the phonebook, the match being detected by the controller; and presenting a notification at the user interface that identifies the second voice call, wherein each entry in the phonebook includes an attribute for a status of the call-waiting function.

14. A method comprising:

receiving a second voice call during a first voice call at an end user device;

retrieving a phonebook from at least one other end user device;

enabling a call-waiting function upon detecting a match between a caller ID of the second voice call and an entry in the phonebook, the match being detected by the end user device; and presenting a notification at the end user device that identifies the second voice call, wherein each entry in the phonebook includes an attribute for a status of the call-waiting function.

15. The method of claim 14, comprising directing the second voice call to a voicemail service if no entry in the phonebook matches the caller ID.

16. The method of claim 14, wherein the first and second voice calls are voice over IP calls.

* * * * *